United States Patent
Allam et al.

(10) Patent No.: US 10,047,673 B2
(45) Date of Patent: Aug. 14, 2018

(54) PRODUCTION OF LOW PRESSURE LIQUID CARBON DIOXIDE FROM A POWER PRODUCTION SYSTEM AND METHOD

(71) Applicant: 8 Rivers Capital, LLC, Durham, NC (US)

(72) Inventors: Rodney John Allam, Wiltshire (GB); Brock Alan Forrest, Durham, NC (US); Jeremy Eron Fetvedt, Raleigh, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 352 days.

(21) Appl. No.: 14/848,909

(22) Filed: Sep. 9, 2015

(65) Prior Publication Data

US 2016/0069262 A1    Mar. 10, 2016

Related U.S. Application Data

(60) Provisional application No. 62/047,744, filed on Sep. 9, 2014.

(51) Int. Cl.
*F02C 1/08*    (2006.01)
*F02C 6/04*    (2006.01)
(Continued)

(52) U.S. Cl.
CPC .............. *F02C 6/04* (2013.01); *C01B 32/50* (2017.08); *C01B 32/60* (2017.08); *F01K 13/00* (2013.01);
(Continued)

(58) Field of Classification Search
CPC ...... F02C 3/34; F02C 3/20; F02C 3/24; F02C 1/08; F01K 25/103; Y02E 20/326
See application file for complete search history.

(56) References Cited

U.S. PATENT DOCUMENTS 3,369,361 A    2/1968    Craig
3,376,706 A    4/1968    Angelino
(Continued)

FOREIGN PATENT DOCUMENTS

JP    2225905    9/1990
JP    2001-132472    5/2001
WO    WO 95/12757    5/1995

OTHER PUBLICATIONS

E.I. Yantovskii et al. , "Computer Exergonomics of Power Plants Without Exhaust Gasas," Energy Convers. Mgmt., Publ. 1992, vol. 33, No. 5-8, pp. 405-412.
(Continued)

*Primary Examiner* — Gerald L Sung
*Assistant Examiner* — Rene Ford
(74) *Attorney, Agent, or Firm* — Womble Bond Dickinson (US) LLP (57) ABSTRACT

The present disclosure relates to systems and methods that provide a low pressure liquid $CO_2$ stream. In particular, the present disclosure provides systems and methods wherein a high pressure $CO_2$ stream, such as a recycle $CO_2$ stream from a power production process using predominately $CO_2$ as a working fluid, can be divided such that a portion thereof can be expanded and used as a cooling stream in a heat exchanger to cool the remaining portion of the high pressure $CO_2$ stream, which can then be expanded to form a low pressure $CO_2$ stream, which may be in a mixed form with $CO_2$ vapor. The systems and methods can be utilized to provide net $CO_2$ from combustion in a liquid form that is easily transportable.

20 Claims, 2 Drawing Sheets

(51) Int. Cl.
*F01K 13/00* (2006.01)
*F01K 25/10* (2006.01)
*F23L 7/00* (2006.01)
*F23J 15/02* (2006.01)
*C01B 32/50* (2017.01)
*C01B 32/60* (2017.01)
*F25J 3/04* (2006.01)
*F02C 3/34* (2006.01)
*B01D 53/00* (2006.01)
*B01D 53/26* (2006.01)

(52) U.S. Cl.
CPC .............. *F01K 25/103* (2013.01); *F02C 1/08* (2013.01); *F23J 15/02* (2013.01); *F23L 7/007* (2013.01); *F25J 3/04018* (2013.01); *F25J 3/04533* (2013.01); *F25J 3/04618* (2013.01); *B01D 53/002* (2013.01); *B01D 53/265* (2013.01); *B01D 2256/22* (2013.01); *B01D 2258/0283* (2013.01); *F02C 3/34* (2013.01); *F23J 2215/50* (2013.01); *F23J 2900/15061* (2013.01); *F25J 2215/80* (2013.01); *F25J 2230/06* (2013.01); *F25J 2240/70* (2013.01); *F25J 2260/80* (2013.01); *Y02E 20/322* (2013.01); *Y02E 20/326* (2013.01); *Y02E 20/344* (2013.01)

(56) References Cited

U.S. PATENT DOCUMENTS

| | | | |
|---|---|---|---|
| 3,503,208 A | 3/1970 | Schmidt | |
| 3,544,291 A | 12/1970 | Schlinger et al. | |
| 3,736,745 A | 6/1973 | Karig | |
| 3,837,788 A | 9/1974 | Craig et al. | |
| 3,868,817 A | 3/1975 | Marion et al. | |
| 3,971,211 A | 7/1976 | Wethe et al. | |
| 3,976,443 A | 8/1976 | Paull et al. | |
| 4,132,065 A | 1/1979 | McGann | |
| 4,154,581 A | 5/1979 | Nack et al. | |
| 4,191,500 A | 3/1980 | Oberg et al. | |
| 4,193,259 A | 3/1980 | Muenger et al. | |
| 4,206,610 A | 6/1980 | Santhanam | |
| 4,498,289 A | 2/1985 | Osgerby | |
| 4,522,628 A | 6/1985 | Savins | |
| 4,602,483 A | 7/1986 | Wilks et al. | |
| 4,702,747 A | 10/1987 | Meyer et al. | |
| 4,721,420 A | 1/1988 | Santhanam et al. | |
| 4,765,143 A | 8/1988 | Crawford et al. | |
| 4,765,781 A | 8/1988 | Wilks et al. | |
| 4,839,030 A | 6/1989 | Comolli et al. | |
| 4,852,996 A | 8/1989 | Knop et al. | |
| 4,881,366 A | 11/1989 | Nurse | |
| 4,957,515 A | 9/1990 | Hegarty | |
| 4,999,992 A | 3/1991 | Nurse | |
| 4,999,995 A | 3/1991 | Nurse | |
| 5,175,995 A | 1/1993 | Pak et al. | |
| 5,247,791 A | 9/1993 | Pak et al. | |
| 5,265,410 A | 11/1993 | Hisatome | |
| 5,345,756 A | 9/1994 | Jahnke et al. | |
| 5,353,721 A | 10/1994 | Mansour et al. | |
| 5,394,686 A | 3/1995 | Child et al. | |
| 5,415,673 A | 5/1995 | Hilton et al. | |
| 5,421,166 A | 6/1995 | Allam et al. | |
| 5,507,141 A | 4/1996 | Stigsson | |
| 5,520,894 A | 5/1996 | Heesink et al. | |
| 5,590,519 A | 1/1997 | Almlöf et al. | |
| 5,595,059 A | 1/1997 | Huber et al. | |
| 5,692,890 A | 12/1997 | Graville | |
| 5,709,077 A | 1/1998 | Beichel | |
| 5,715,673 A | 2/1998 | Beichel | |
| 5,724,805 A | 3/1998 | Golomb et al. | |
| 5,802,840 A | 9/1998 | Wolf | |
| 5,906,806 A | 5/1999 | Clark | |
| 5,937,652 A | 8/1999 | Abdelmalek | |
| 6,024,029 A | 2/2000 | Clark | |
| 6,148,602 A | 11/2000 | Demetri | |
| 6,170,264 B1 | 1/2001 | Viteri et al. | |
| 6,196,000 B1 | 3/2001 | Fassbender | |
| 6,199,364 B1 | 3/2001 | Kendall et al. | |
| 6,202,574 B1 | 3/2001 | Liljedahl et al. | |
| 6,209,307 B1 | 4/2001 | Hartman | |
| 6,260,348 B1 | 7/2001 | Sugishita et al. | |
| 6,263,661 B1 | 7/2001 | Van der Burgt et al. | |
| 6,269,624 B1 | 8/2001 | Frutschi et al. | |
| 6,289,666 B1 | 9/2001 | Ginter | |
| 6,298,664 B1 | 10/2001 | Åsen et al. | |
| 6,333,015 B1 | 12/2001 | Lewis | |
| 6,389,814 B2 | 5/2002 | Viteri et al. | |
| 6,430,916 B2 | 8/2002 | Sugishita et al. | |
| 6,532,745 B1 | 3/2003 | Neary | |
| 6,536,205 B2 | 3/2003 | Sugishita et al. | |
| 6,543,214 B2 | 4/2003 | Sasaki et al. | |
| 6,550,234 B2 | 4/2003 | Guillard | |
| 6,598,398 B2 | 7/2003 | Viteri et al. | |
| 6,612,113 B2 | 9/2003 | Guillard | |
| 6,622,470 B2 | 9/2003 | Viteri et al. | |
| 6,629,414 B2 | 10/2003 | Fischer | |
| 6,637,183 B2 | 10/2003 | Viteri et al. | |
| 6,684,643 B2 | 2/2004 | Frutschi | |
| 6,764,530 B2 | 7/2004 | Iijima | |
| 6,775,987 B2 | 8/2004 | Sprouse et al. | |
| 6,802,178 B2 | 10/2004 | Sprouse et al. | |
| 6,820,689 B2 | 11/2004 | Sarada | |
| 6,824,710 B2 | 11/2004 | Viteri et al. | |
| 6,871,502 B2 | 3/2005 | Marin et al. | |
| 6,877,319 B2 | 4/2005 | Linder et al. | |
| 6,877,322 B2 | 4/2005 | Fan | |
| 6,898,936 B1 | 5/2005 | Ochs et al. | |
| 6,910,335 B2 | 6/2005 | Viteri et al. | |
| 6,918,253 B2 | 7/2005 | Fassbender | |
| 6,945,029 B2 | 9/2005 | Viteri | |
| 6,945,052 B2 | 9/2005 | Frutschi et al. | |
| 6,993,912 B2 | 2/2006 | Fischer | |
| 7,007,474 B1 | 3/2006 | Ochs et al. | |
| 7,007,486 B2 | 3/2006 | Sprouse et al. | |
| 7,021,063 B2 | 4/2006 | Viteri | |
| 7,022,168 B2 | 4/2006 | Schimkat et al. | |
| 7,043,920 B2 | 5/2006 | Viteri et al. | |
| 7,074,033 B2 | 7/2006 | Neary | |
| 7,089,743 B2 | 8/2006 | Frutschi et al. | |
| 7,111,463 B2 | 9/2006 | Sprouse et al. | |
| 7,124,589 B2 | 10/2006 | Neary | |
| 7,147,461 B2 | 12/2006 | Neary | |
| 7,191,587 B2 | 3/2007 | Marin et al. | |
| 7,192,569 B2 | 3/2007 | Stewart | |
| 7,281,590 B2 | 10/2007 | Van de Waal | |
| 7,284,362 B2 | 10/2007 | Marin et al. | |
| 7,299,637 B2 | 11/2007 | Becker | |
| 7,303,597 B2 | 12/2007 | Sprouse et al. | |
| 7,328,581 B2 | 2/2008 | Christensen et al. | |
| 7,334,631 B2 | 2/2008 | Kato et al. | |
| 7,360,639 B2 | 4/2008 | Sprouse et al. | |
| 7,363,764 B2 | 4/2008 | Griffin et al. | |
| 7,377,111 B2 | 5/2008 | Agnew | |
| 7,387,197 B2 | 6/2008 | Sprouse et al. | |
| 7,402,188 B2 | 7/2008 | Sprouse | |
| 7,469,544 B2 | 12/2008 | Farhangi | |
| 7,469,781 B2 | 12/2008 | Chataing et al. | |
| 7,516,607 B2 | 4/2009 | Farhangi et al. | |
| 7,516,609 B2 | 4/2009 | Agnew | |
| 7,547,419 B2 | 6/2009 | Sprouse et al. | |
| 7,547,423 B2 | 6/2009 | Sprouse et al. | |
| 7,553,463 B2 | 6/2009 | Zauderer | |
| 7,615,198 B2 | 11/2009 | Sprouse et al. | |
| 7,665,291 B2 | 2/2010 | Anand et al. | |
| 7,717,046 B2 | 5/2010 | Sprouse et al. | |
| 7,722,690 B2 | 5/2010 | Shires et al. | |
| 7,731,783 B2 | 6/2010 | Sprouse et al. | |
| 7,739,874 B2 | 6/2010 | Nigro | |
| 7,740,671 B2 | 6/2010 | Yows et al. | |
| 7,740,672 B2 | 6/2010 | Sprouse | |
| 7,814,975 B2 | 10/2010 | Hagen et al. | |

(56) References Cited

U.S. PATENT DOCUMENTS

| | | |
|---|---|---|
| 7,826,054 B2 | 11/2010 | Zillmer et al. |
| 7,827,797 B2 | 11/2010 | Pronske et al. |
| 7,874,140 B2 | 1/2011 | Fan et al. |
| 7,882,692 B2 | 2/2011 | Pronske et al. |
| 7,927,574 B2 | 4/2011 | Stewart |
| 7,934,383 B2 | 5/2011 | Gutierrez et al. |
| 7,950,243 B2 | 5/2011 | Gurin |
| 8,043,588 B2 | 10/2011 | Hustad et al. |
| 8,088,196 B2 | 1/2012 | White et al. |
| 8,109,095 B2 | 2/2012 | Henriksen et al. |
| 8,220,248 B2 | 7/2012 | Wijmans et al. |
| 8,596,075 B2 | 12/2013 | Allam et al. |
| 8,776,532 B2 | 7/2014 | Allam et al. |
| 8,959,887 B2 | 2/2015 | Allam et al. |
| 8,986,002 B2 | 3/2015 | Palmer et al. |
| 9,068,743 B2 | 6/2015 | Palmer et al. |
| 2002/0134085 A1 | 9/2002 | Frutschi |
| 2003/0131582 A1 | 7/2003 | Anderson et al. |
| 2003/0221409 A1 | 12/2003 | McGowan |
| 2004/0011057 A1 | 1/2004 | Huber |
| 2004/0123601 A1 | 7/2004 | Fan |
| 2004/0134197 A1 | 7/2004 | Marin et al. |
| 2005/0126156 A1 | 6/2005 | Anderson et al. |
| 2006/0242907 A1 | 11/2006 | Sprouse et al. |
| 2007/0180768 A1 | 8/2007 | Briesch et al. |
| 2007/0274876 A1 | 11/2007 | Chiu et al. |
| 2008/0010967 A1 | 1/2008 | Griffin et al. |
| 2008/0104958 A1 | 5/2008 | Finkenrath et al. |
| 2008/0115500 A1 | 5/2008 | MacAdam et al. |
| 2008/0166672 A1 | 7/2008 | Schlote et al. |
| 2008/0187877 A1 | 8/2008 | Fitzsimmons et al. |
| 2008/0190214 A1 | 8/2008 | Ubowski et al. |
| 2008/0309087 A1 | 12/2008 | Evulet et al. |
| 2009/0025390 A1 | 1/2009 | Christensen et al. |
| 2009/0061264 A1 | 3/2009 | Agnew |
| 2009/0130660 A1 | 5/2009 | Faham et al. |
| 2009/0229271 A1 | 9/2009 | Ruyck et al. |
| 2009/0260585 A1 | 10/2009 | Hack et al. |
| 2009/0301054 A1 | 12/2009 | Simpson et al. |
| 2010/0018218 A1 | 1/2010 | Riley et al. |
| 2010/0024378 A1 | 2/2010 | Ackermann et al. |
| 2010/0024381 A1 | 2/2010 | Ackermann et al. |
| 2010/0024433 A1 | 2/2010 | Ackermann et al. |
| 2010/0031668 A1 | 2/2010 | Kepplinger |
| 2010/0077752 A1 | 4/2010 | Papile |
| 2010/0300063 A1 | 12/2010 | Palmer et al. |
| 2011/0036011 A1 | 2/2011 | Sprouse et al. |
| 2011/0127773 A1 | 6/2011 | Freund et al. |
| 2011/0179799 A1 | 7/2011 | Allam et al. |
| 2011/0233940 A1 | 9/2011 | Aoyama et al. |
| 2011/0239651 A1 | 10/2011 | Aoyama et al. |
| 2012/0067054 A1 | 3/2012 | Palmer et al. |
| 2012/0067056 A1 | 3/2012 | Palmer et al. |
| 2012/0073261 A1 | 3/2012 | Palmer et al. |
| 2012/0237881 A1 | 9/2012 | Allam et al. |
| 2013/0104525 A1 | 5/2013 | Allam et al. |
| 2013/0118145 A1 | 5/2013 | Palmer et al. |
| 2013/0205746 A1 | 8/2013 | Allam et al. |
| 2013/0213049 A1 | 8/2013 | Allam et al. |

OTHER PUBLICATIONS

Hong et al., "Analysis of Oxy-Fuel Combustion Power Cycle Utilizing a Pressurized Coal Combustor," *Energy*, Available Online Jun. 21, 2009, pp. 1332-1340, vol. 34, No. 9.

PRODUCTION OF LOW PRESSURE LIQUID CARBON DIOXIDE FROM A POWER PRODUCTION SYSTEM AND METHOD

CROSS-REFERENCE TO RELATED APPLICATIONS

The present application claims priority to U.S. Provisional Patent Application No. 62/047,744, filed Sep. 9, 2015, the disclosure of which is incorporated herein by reference.

FIELD OF THE DISCLOSURE

The presently disclosed subject matter relates to systems and methods for production of liquid carbon dioxide. Particularly, the liquid carbon dioxide can be a low pressure stream of carbon dioxide formed from carbon dioxide produced in a power production system and method, specifically a system and method using carbon dioxide as a working fluid.

BACKGROUND

Carbon capture and sequestration (CCS) is a key consideration of any system or method that produces carbon dioxide ($CO_2$). This is particularly relevant to power production through combustion of a fossil fuel or other hydrocarbon-containing material. Several power production methods have been suggested where CCS is achievable. One publication in the field of high efficiency power generation with CCS, U.S. Pat. No. 8,596,075 to Allam et al., provides for desirable efficiencies in closed cycle oxy-fuel combustion systems utilizing a recycle $CO_2$ stream. In such system, the $CO_2$ is captured as a relatively pure stream at high pressure.

Current proposals for $CO_2$ disposal often require transportation in high pressure pipelines as a high density, supercritical fluid at pressures of 100 bar (10 MPa) to 250 bar (25 MPa). Such pipelines require high capital expenditures. Piped $CO_2$ is either sequestered in an underground geologic formation, such as a deep saline aquifer, or may be used to economic advantage, such as for enhanced oil recovery (EOR).

The use of $CO_2$ for EOR necessitates its availability over a wide area of an oil rich region. This would require the extensive use of a network of pipelines extending over the region. This becomes prohibitively expensive in many uses, particularly off-shore oil fields. It thus would be useful to provide bulk quantities of $CO_2$ (such as produced from a power production system and method) in liquid form that would be easier for delivery to off-shore oil production platforms. Other beneficial uses of $CO_2$ gathered from power production facilities can be envisioned if the $CO_2$ could be provided in a liquefied form.

SUMMARY OF THE DISCLOSURE

The present disclosure provides systems and methods useful in the production of liquid $CO_2$. The disclosed systems and methods can make use of $CO_2$ from any source. The systems and methods, however, may be particularly beneficial in connection with a system and method that produces a high pressure $CO_2$ stream, particularly a high pressure $CO_2$ stream at near ambient temperature. The present systems and methods are further beneficial in that liquid $CO_2$ can be produced with substantially high purity, particularly with low levels of oxygen, nitrogen, and noble gases (e.g., Argon).

In certain embodiments, a $CO_2$ source that can be used for producing liquid $CO_2$ can be a power production system, particularly oxyfuel combustion systems and methods, and more particularly combustion methods utilizing a $CO_2$ working fluid. Systems and methods for power production wherefrom a $CO_2$ stream may be obtained are described in U.S. Pat. No. 8,596,075, U.S. Pat. No. 8,776,532, U.S. Pat. No. 8,959,887, U.S. Pat. No. 8,986,002, U.S. Pat. No. 9,068,743, U.S. Pub. No. 2010/0300063, U.S. Pub. No. 2012/0067054, U.S. Pub. No. 2012/0237881, and U.S. Pub. No. 2013/0213049, the disclosures of which are incorporated herein by reference in their entireties.

In some embodiments, the present disclosure relates to methods for production of a low pressure liquid carbon dioxide ($CO_2$) stream. Such methods may comprise providing a high pressure $CO_2$ stream at a pressure of about 60 bar (6 MPa) or greater, about 100 bar (10 MPa) or greater, or in a pressure range as otherwise disclosed herein. The methods further may comprise dividing out a portion of the high pressure $CO_2$ stream and expanding the portion to form a cooling stream that may be useful as a refrigerant. For example, the cooling stream may be at a temperature of about $-20°$ C. or less or in a temperature range as otherwise disclosed herein. The methods further may comprise cooling the high pressure $CO_2$ stream to a temperature of about $5°$ C. or less (preferably about $-10°$ C. or less) by passing the a high pressure $CO_2$ stream through a heat exchanger in a heat exchange relationship with the cooling stream. The methods further may comprise expanding the high pressure $CO_2$ stream so as to form a low pressure $CO_2$ stream at a pressure of down to about 6 bar (0.6 MPa). The methods further may comprise passing the low pressure $CO_2$ stream through a separator effective to separate a vapor stream therefrom and provide the low pressure liquid $CO_2$ stream.

In further embodiments, the present disclosure relates to systems useful in the production of a low pressure liquid carbon dioxide ($CO_2$) stream. In some embodiments, such systems may comprise one or more components adapted for providing a high pressure $CO_2$ stream, one or more heat exchangers, one or more expanders (e.g., valves), one or more separators, and one or more distillers. In a non-limiting example, a system according to the present disclosure may comprise: piping adapted for passage of a high pressure $CO_2$ stream; a divider adapted for dividing the high pressure $CO_2$ stream into a cooling fraction and a bulk stream; an expander adapted for expanding and cooling the cooling fraction of the high pressure $CO_2$ stream; a heat exchanger adapted for cooling the bulk high pressure $CO_2$ stream against the warming expanded and cooled cooling fraction of the high pressure $CO_2$ stream; an expander adapted for expanding and cooling the bulk high pressure $CO_2$ stream to form a two phase, low pressure $CO_2$ stream; a separator adapted for removing a vapor fraction from the two phase, low pressure $CO_2$ stream; and a distiller adapted for removing at least a portion of non-$CO_2$ components and providing a low pressure, liquid $CO_2$ stream.

In still other embodiments, the present disclosure relates to methods for production of a low pressure liquid carbon dioxide ($CO_2$) stream from a high pressure $CO_2$ stream from a power production process. In some embodiments, such method can comprise combusting a carbonaceous or hydrocarbon fuel in a combustor in the presence of oxygen and a recycle $CO_2$ stream at a pressure of about 100 bar (10 MPa) or greater and a temperature of about $400°$ C. or greater to form a combustor exit stream comprising $CO_2$. The combustor exit stream in particular may be at a pressure of about 200 bar (20 MPa) to about 400 bar (40 MPa). The combustor exit stream in particular may be at a temperature of about 800° C. to about 1,600° C. The method further may comprise expanding the combustor exit stream in a turbine to generate power and form a turbine exit stream comprising $CO_2$ at a pressure of about 50 bar (5 MPa) or less. The turbine exit stream particularly may be at a pressure of about 20 bar (2 MPa) to about 40 bar (4 MPa). The method further may comprise cooling the turbine exit stream in a heat exchanger with heat transferred to the heating recycle $CO_2$ stream. Cooling may be to a temperature of about 80° C. or less, such as to near ambient temperature. The method also may comprise further cooling the turbine exhaust stream against ambient cooling means and separating condensed water in a separator. The method further may comprise pumping $CO_2$ from the turbine exit pressure to a pressure of about 100 bar (10 MPa) or greater to form a high pressure $CO_2$ stream. In particular, the high pressure $CO_2$ stream may be at a pressure of about 100 bar (10 MPa) to about 500 bar (50 MPa) or about 200 bar (20 MPa) to about 400 bar (40 MPa). The $CO_2$ from the cooled turbine exit stream may be compressed to a first pressure, cooled to increase the density thereof, and then pumped to the second, greater pressure in the range noted above. A portion of the high pressure $CO_2$ stream can be passed back through the heat exchanger to be heated against the cooling turbine exit stream prior to passage back into the combustor. Further heating also may be applied to the stream after compression and before passage into the combustor, such further heating coming from a source other than the turbine exit stream. A portion of the high pressure $CO_2$ stream (which portion can comprise any net $CO_2$ produced in combustion) can be cooled to a temperature of about 5° C. or less, such as, for example, in a heat exchanger using a refrigerant. The refrigerant may comprise a portion of the high pressure $CO_2$ stream that can be utilized as a cooling fraction by expanding the portion to a pressure that is about 30 bar (3 MPa) or less but is above the triple point pressure of $CO_2$. The cooling fraction can be a temperature of about 0° C. or less or about −20° C. or less. In particular embodiments, the cooling fraction of the high pressure $CO_2$ stream may be cooled to a temperature of about −55° C. to about 0° C. The portion of the high pressure $CO_2$ stream that is cooled in the heat exchanger against the $CO_2$ cooling fraction can be expanded to a pressure of down to about 6 bar (0.6 MPa) (preferably always maintaining a pressure above the triple point pressure of $CO_2$) so as to form the low pressure liquid $CO_2$ stream. In particular, the cooled portion of the high pressure $CO_2$ stream may be expanded to a pressure that is about 30 bar (3 MPa) or less but is above the triple point pressure of $CO_2$.

Methods as described above further may comprise further elements. For example, the cooling of the turbine exit stream particularly may be to a temperature of about 70° C. or less or about 60° C. or less. One heat exchanger or a plurality of heat exchangers may be used. For example, an economizer heat exchanger may be used followed by a cold water heat exchanger. After cooling, the methods also may comprise passing the turbine exit stream comprising $CO_2$ through one or more separators to remove at least water therefrom. Further prior to said pumping step, the methods may comprise compressing the turbine exit stream comprising $CO_2$ to a pressure of up to about 80 bar (8 MPa) (e.g., a pressure of about 60 bar (6 MPa) to about 80 bar (8 MPa)). Still further, the methods may comprise increasing the density of the turbine exit stream comprising $CO_2$, such as by cooling the stream in a cold water heat exchanger. The density, for example, may be increased to about 600 kg/m$^3$ or greater, about 700 kg/m$^3$ or greater, or about 800 kg/m$^3$ or greater. The turbine exit stream may be compressed prior to increasing the density of the stream.

The methods may further comprise, after said cooling of the bulk high pressure $CO_2$ stream in a heat exchanger and prior to said expanding, passing the bulk high pressure $CO_2$ stream through a re-boiler. The re-boiler may particularly be combined with a distiller (e.g., a stripping column). As such, the re-boiler may provide heating to the distiller.

The methods may comprise further processing of the bulk low pressure liquid $CO_2$ stream. For example, the low pressure liquid $CO_2$ stream may be a two phase material including the liquid phase and a vapor phase. Thus, the methods may comprise passing the low pressure liquid $CO_2$ stream through a separator effective to separate a vapor stream therefrom. In some embodiments, the vapor stream may comprise up to about 8% (particularly up to about 4% or up to about 6%) by mass of the low pressure liquid $CO_2$ stream passed through the separator. In some embodiments, the vapor stream may comprise about 1% to about 75% by mass $CO_2$. In some embodiments, the vapor stream may comprise about 25% to about 99% by mass of a combination of $N_2$, $O_2$, and argon (or further inert gases). The methods also may comprise passing the remaining low pressure liquid $CO_2$ stream (e.g., after withdrawing the vapor phase therefrom) through a distiller, such as a stripping column (which may include the re-boiler, as discussed above).

After the distillation step, the liquid $CO_2$ may be provided to a pump to increase its pressure to a desired value. The cold discharge stream from the pump may be supplied to a heat exchanger upstream of the reboiler to supplement the cooling duty of the high pressure $CO_2$ that is expanded to create a refrigerant. The warmed refrigerant $CO_2$ and/or the overhead stream from a stripping distillation column may be provided to a compressor that discharges the flow at a pressure compatible with the system where the high pressure $CO_2$ stream was sourced. The vapor phase stream from the separator may also be provided to a system performing additional separation processes. Alternatively, the vapor phase stream may be vented.

The low pressure liquid $CO_2$ stream provided according to the present disclosure in particular may have only a very low oxygen concentration. In some embodiments, the low pressure liquid $CO_2$ stream may have an oxygen content of no more than about 25 ppm, particularly no more than about 10 ppm. The low pressure liquid $CO_2$ stream also may have a similarly low concentration of inert gases, such as nitrogen and argon.

As non-limiting examples, the present disclosure can relate to the following embodiments. Such embodiments are intended to be illustrative of the broader nature of the disclosure as a whole.

In some embodiments, the present disclosure can provide methods for production of a low pressure liquid $CO_2$ stream. For example, such method can comprise: combusting a carbonaceous or hydrocarbon fuel with oxygen in a combustor in the presence of a recycle $CO_2$ stream at a pressure of about 100 bar (100 MPa) or greater and a temperature of about 400° C. or greater to form a combustor exit stream comprising $CO_2$; expanding the combustor exit stream in a turbine to generate power and form a turbine exit stream comprising $CO_2$ at a pressure of about 50 bar (5 MPa) or less; cooling the turbine exit stream in a first heat exchanger to form a cooled turbine exit stream; pumping $CO_2$ from the cooled turbine exit stream to a pressure of about 100 bar (10

MPa) or greater to form a high pressure $CO_2$ stream; dividing the high pressure $CO_2$ stream into a bulk portion and a cooling portion; expanding the cooling portion of the high pressure $CO_2$ stream to reduce the temperature thereof to about −20° C. or less; cooling the bulk portion of the high pressure $CO_2$ stream to a temperature of about 5° C. or less by passing the bulk portion of the high pressure $CO_2$ stream through a second heat exchanger against the expanded cooling portion of the high pressure $CO_2$ stream; and expanding the cooled, bulk portion of the high pressure $CO_2$ stream to a pressure that is about 30 bar (3 MPa) or less but is greater than the triple point pressure of $CO_2$ so as to form the low pressure liquid $CO_2$ stream. In further embodiments, such method may include one or more of the following statements, which statements may be combined in any number and any combination. Moreover, such method may include any further elements as otherwise described herein.

The combustor exit stream can be at a pressure of about 200 bar (20 MPa) to about 400 bar (40 MPa).

The combustor exit stream can be at a temperature of about 800° C. to about 1,600° C.

The turbine exit stream comprising $CO_2$ can be at a pressure of about 20 bar (2 MPa) to about 40 bar (4 MPa).

The turbine exit stream can be cooled in the heat exchanger to a temperature of about 80° C. or less.

The method further can comprise passing the cooled turbine exit stream comprising $CO_2$ through one or more separators to remove at least water therefrom.

The method further can comprise heating one or both of the oxygen and the recycle $CO_2$ stream in the heat exchanger against the turbine exit stream.

The high pressure $CO_2$ stream can be at a pressure of about 200 bar (20 MPa) to about 400 bar (40 MPa).

The bulk portion of the high pressure $CO_2$ stream can be cooled to a temperature of about −55° C. to about 0° C.

The method further can comprise, after cooling of the bulk portion of the high pressure $CO_2$ stream and prior to expanding of the bulk portion of the high pressure $CO_2$ stream, passing the bulk portion of the high pressure $CO_2$ stream through a re-boiler.

The re-boiler can be in a stripping column.

The method further can comprise passing the low pressure liquid $CO_2$ stream through a separator effective to separate a vapor stream therefrom.

The vapor stream can comprise up to about 8% by mass of the low pressure liquid $CO_2$ stream passed through the separator.

The vapor stream can comprise about 1% to about 75% by mass $CO_2$ and about 25% to about 99% by mass of one or more of $N_2$, $O_2$, and Argon.

The method further can comprise passing the remaining low pressure liquid $CO_2$ stream into a stripping column.

The low pressure liquid $CO_2$ stream exiting the stripping column can have an oxygen content of no more than about 25 ppm.

The method can comprise pumping the low pressure liquid $CO_2$ stream to a pressure of at least about 100 bar (10 MPa).

The method can comprise delivering the pumped liquid $CO_2$ stream to a $CO_2$ pipeline.

The method further can comprise mixing an overhead vapor from the stripping column with the cooling portion of the high pressure $CO_2$ stream exiting the second heat exchanger.

The method further can comprise adding the mixture of the overhead vapor from the stripping column and the cooling portion of the high pressure $CO_2$ stream exiting the second heat exchanger to the cooled turbine exit stream.

In further exemplary embodiments, the present disclosure can provide systems configured for production of a low pressure liquid $CO_2$ stream. For example, a system can comprise: a splitter configured for dividing a high pressure $CO_2$ stream into a first portion and a second portion; a first expander configured for expanding and cooling the first portion of the high pressure $CO_2$ stream; a heat exchanger for cooling the second portion of the high pressure $CO_2$ stream against the cooled first portion of the high pressure $CO_2$ stream exiting the expander; and a second expander configured for expanding the cooled second portion of the high pressure $CO_2$ stream so as to form the low pressure liquid $CO_2$ stream. In further embodiments, such system may include one or more of the following statements, which statements may be combined in any number and any combination. Moreover, such system may include any further elements as otherwise described herein.

The first expander can be configured for cooling the first portion of the high pressure $CO_2$ stream to a temperature of about −20° C. or less.

The heat exchanger can be configured for cooling the second portion of the high pressure $CO_2$ stream to a temperature of about 5° C. or less.

The second expander can be configured to expand the cooled second portion of the high pressure $CO_2$ stream to a pressure that is about 30 bar (3 MPa) or less but is greater than the triple point pressure of $CO_2$.

The system further can comprise a combined stripping column and re-boiler.

The stripping column can be in line downstream from the second expander, and the re-boiler can be in line downstream from the heat exchanger and upstream from the second expander.

The system further can comprise a liquid/vapor separator positioned downstream from the second expander and upstream from the stripping column.

The system further can comprise a compressor configured for receiving the first portion of the high pressure $CO_2$ stream from the heat exchanger.

The system further can comprise: a combustor configured for combusting a carbonaceous or hydrocarbon fuel with oxygen in a combustor in the presence of a recycle $CO_2$ stream at a pressure of about 100 bar (10 MPa) or greater and a temperature of about 400° C. or greater to form a combustor exit stream comprising $CO_2$; a turbine configured for expanding the combustor exit stream to generate power and form a turbine exit stream comprising $CO_2$; a further heat exchanger configured for cooling the turbine exit stream; and a pump configured for pumping $CO_2$ from the cooled turbine exit stream to form the high pressure $CO_2$ stream.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE FIGURES

Reference will now be made to the accompanying drawings, which are not necessarily drawn to scale, and wherein.

DETAILED DESCRIPTION

The present subject matter will now be described more fully hereinafter with reference to exemplary embodiments thereof. These exemplary embodiments are described so that this disclosure will be thorough and complete, and will fully convey the scope of the subject matter to those skilled in the art. Indeed, the subject matter can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure relates to systems and methods adapted for production of low pressure liquid carbon dioxide ($CO_2$). The systems and methods particularly may be adapted to intake a stream comprising non-liquid $CO_2$ (e.g., gaseous $CO_2$ or supercritical $CO_2$) and convert at least a portion of the non-liquid $CO_2$ to liquid $CO_2$. The intake stream may comprise a fraction of liquid $CO_2$; however, the intake stream preferably comprises no more than about 25%, no more than about 10%, no more than about 5%, or no more than about 2% by weight liquid $CO_2$.

Liquid $CO_2$ produced according to the present disclosure can be produced at a low pressure in that the pressure of the produced liquid $CO_2$ is less than 50 bar (5 MPa) but greater than the triple point pressure of $CO_2$ so as to preferably avoid substantial formation of solid $CO_2$. In some embodiments, the produced liquid $CO_2$ can be at a pressure of down to about 6 bar (0.6 MPa), in particular about 30 bar (3 MPa) to about 6 bar 0.6 MPa), about 25 bar 2.5 MPa) to about 6 bar (0.6 MPa), or about 15 bar (1.5 MPa) to about 6 bar (0.6 MPa). The temperature of the produced liquid $CO_2$ preferably is in the range of the saturation temperature at the given pressure. For example, the temperature can be in the range of about 5° C. to about −55° C., about −5° C. to about −55° C., or about −15° C. to about −55° C.

Methods of producing liquid $CO_2$ according to embodiments of the present disclosure generally can comprise cooling and expanding the $CO_2$ from the intake stream. Depending upon the source of the intake stream, the methods may comprise one or more compression steps. In preferred embodiments, the intake $CO_2$ can be at a pressure of about 60 bar (6 MPa) or greater, about 100 bar (10 MPa) or greater, or about 200 bar (20 MPa) or greater. In other embodiments, the pressure of the intake $CO_2$ can be in the range of about 60 bar (6 MPa) to about 400 bar (40 MPa). The temperature of the intake $CO_2$ may be greater than 10° C. or may be in the range of about 10° C. to about 40° C., about 12° C. to about 35° C., or about 15° C. to about 30° C. In some embodiments, the intake $CO_2$ can be at about ambient temperature.

Figure 1:
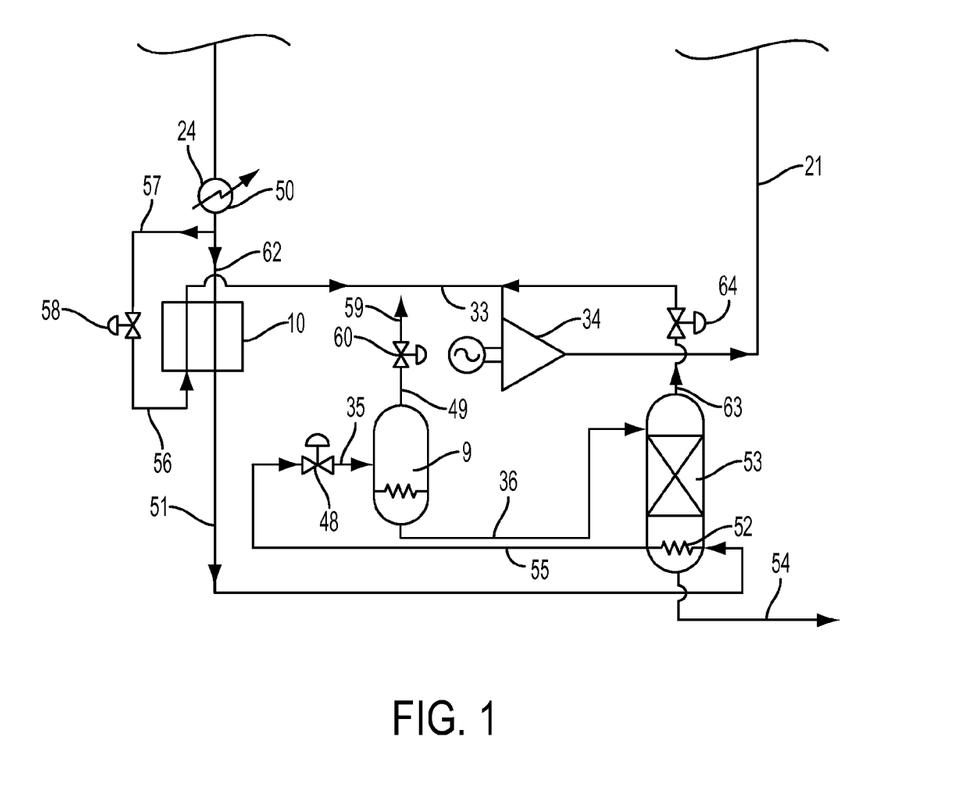
FIG. 1 shows a flow diagram of a system according to embodiments of the present disclosure for formation of a low pressure liquid $CO_2$ stream.

An embodiment of a system and method according to the present disclosure useful in the production of liquid $CO_2$ is shown in FIG. 1. As seen therein, a high pressure $CO_2$ stream 24 may be cooled by passage through a water cooler 50 (which may be optional depending upon the actual temperature of the high pressure $CO_2$ stream). The high pressure $CO_2$ stream 24 is then divided into a first portion and a second portion using a splitter 68 (or other suitable system element configured for dividing a stream) to provide a high pressure $CO_2$ side stream 57 that can be expanded, such as through a valve 58 or other suitable device, to form a cooling $CO_2$ stream 56. The remaining high pressure $CO_2$ stream 62 passes through a heat exchanger 10 where it is cooled by the cooling $CO_2$ stream 56, which exits as $CO_2$ stream 33. The cooled, high pressure $CO_2$ stream 51 exiting the cold end of the heat exchanger 10 can be at a temperature of about 5° C. or less, about 0° C. or less, about −10° C. or less, or about −20° C. or less (for example, about 5° C. to about −40° C. or about 0° C. to about −35° C.). The cooled, high pressure $CO_2$ stream 51 can be expanded to form the liquid $CO_2$ stream. As illustrated in FIG. 1, the cooled, high pressure $CO_2$ stream 51 first passes through a re-boiler 52, which is part of a stripping column 53 in FIG. 1, and thus supplies heating for the distillation therein, which is further described below. Passage through the re-boiler thus may be optional. The high pressure $CO_2$ stream 55 leaving the re-boiler 52 is expanded to form the low pressure liquid $CO_2$ stream 35 at a temperature and pressure in the ranges described above. In FIG. 1, stream 55 is expanded through a valve 48, but any device useful for expanding a compressed $CO_2$ stream may be used. For example, the expansion device can be a work producing system, such as a turbine, which lowers the enthalpy of the $CO_2$ between the inlet and the outlet and further lowers outlet temperature.

The expansion of the high pressure $CO_2$ stream (e.g., from the range of about 60 bar (6 MPa) to about 400 bar (40 MPa)) to form the low pressure $CO_2$ stream (e.g., at a pressure of about 30 bar (3 MPa) or less but greater than the triple point pressure of $CO_2$) can result in a two phase product stream formed of a gas and liquid mixture having the same total enthalpy as the $CO_2$ stream input to the valve (or other expansion device). The temperature of the two phase mixture leaving the valve (or a turbine per the exemplary, alternative embodiment noted above) particularly can be at the saturation temperature of the liquid at the reduced pressure. In FIG. 1, stream 56 exiting valve 58 and stream 35 exiting valve 48 may both be two phase streams. The two phase, low pressure $CO_2$ stream 35 exiting valve 48 may be passed through a separator 9 to provide the $CO_2$ vapor fraction stream 49 and the $CO_2$ liquid fraction stream 36.

In embodiments wherein the input high pressure $CO_2$ stream is from an oxy-combustion power production system, the vapor fraction that can be separated from the low pressure liquid $CO_2$ stream will contain the bulk of the inert gases (e.g., nitrogen, excess $O_2$, and noble gases, such as argon) that are present in the oxygen source and the fuel source (e.g., natural gas). As a non-limiting example, an oxy-combustion power production process may be carried out with a 1% excess oxygen stream flow into a combustor, the oxygen stream being formed of approximately 99.5% oxygen and 0.5% argon. The resulting net $CO_2$ product can include $O_2$ at a 2% concentration and argon at a 1% concentration.

According to the present disclosure, cooling of a $CO_2$ product from a power system as exemplified above by indirect cooling means to a temperature which, on expansion through a valve to a pressure of, for example, 10 bar (1 MPa), results in a flash vapor fraction of approximately 4%. In various embodiments, the vapor fraction may be up to about 6%, up to about 5%, or up to about 4% by mass of the total liquid $CO_2$ stream (e.g., stream 35 in FIG. 1). The vapor stream (e.g., stream 49 in FIG. 1) can comprise about 1% to about 75% by mass $CO_2$ and about 25% to about 99% by mass of a combination of $N_2$, $O_2$, and argon (or other inert gases). In further embodiments, the vapor stream can comprise about 60% or greater, about 65% or greater, or about 70% or greater by mass of the combination of $N_2$, $O_2$, and argon (or other inert gases). The flash vapor fraction (e.g., stream 49 leaving the separator 9 in FIG. 1) may be vented to the atmosphere or captured. Production of the flash vapor stream is beneficial in embodiments where the input $CO_2$ stream is derived from an oxy-combustion process as removal of the vapor fraction will prevent a build-up of inert argon and/or nitrogen (which may be present in natural gas and/or coal derived fuel gas that is combusted and which may be present in an oxygen stream derived from a cryogenic air separation plant). To form the flash vapor fraction, it can be useful to cool the high pressure $CO_2$ stream (e.g., stream 62 in FIG. 1) to a temperature of about −30° C. or less or about −33° C. or less prior to expansion. In embodiments where the input high pressure $CO_2$ stream is from a source that may be substantially or completely devoid of inert gases (and optionally oxygen), it may not be necessary to form the flash vapor fraction. In embodiments using natural gas fuel having a significant fraction of $N_2$ in the oxy-fuel power production process, it can be useful to adjust the temperature to which the stream 51 is cooled so as to ensure the removal of the bulk of the $N_2$ with the $O_2$ and argon in stream 49 together with a minimum loss of $CO_2$ in stream 49.

Preferably, the majority of the concentration of $O_2$ and argon (and other inert gases) from the input $CO_2$ stream is removed in the flash vapor fraction such that the $CO_2$ liquid fraction stream (e.g., stream 36 in FIG. 1) has only a minor concentration of $N_2$, $O_2$, and argon—e.g., about 1% or less, about 0.5% or less, or about 0.2% or less by mass. This minor concentration of $N_2$, $O_2$, and argon can be stripped from the $CO_2$ liquid fraction stream, such as by using a distillation apparatus (e.g., the stripping column 53 in FIG. 1). Alternatively to the illustration of FIG. 1, a stripping section may be fitted in the lower part of the flash separator. In embodiments utilizing the stripping column, a re-boiler (component 52 in FIG. 1 as discussed above) can be included to withdraw remaining available heat from part or all of the high pressure $CO_2$ stream (e.g., stream 51 in FIG. 1). Such heating can be varied to provide the necessary liquid to vapor ratio to reduce the oxygen concentration in the net liquid $CO_2$ product (stream 54 in FIG. 1). The oxygen concentration in the net liquid $CO_2$ stream can be no more than about 25 ppm, no more than about 20 ppm, or no more than about 10 ppm.

In further embodiments, the product liquid $CO_2$ stream 54 can be pumped to a high pressure and heated in heat exchanger 10 (or in a further heat exchanger or by further means) for delivery into a $CO_2$ pipeline. The product liquid $CO_2$ stream particularly may be pumped to a pressure of about 100 bar (10 MPa) to about 250 bar (25 MPa).

Returning to FIG. 1, the top product 63 leaving the stripping column 53 may be further reduced in pressure if desired, such as in valve 64 and then combined with $CO_2$ stream 33. The combined streams may be compressed in compressor 34 to provide a return high pressure $CO_2$ stream 21, which may be, for example, combined with the input high pressure $CO_2$ stream 24 or added to a further $CO_2$ containing stream (see FIG. 2).

The foregoing embodiments for forming a low pressure liquid $CO_2$ stream can be economically desirable in that about 95% or greater, about 96% or greater, or about 97% or greater by mass of the $CO_2$ in the net low pressure $CO_2$ stream (e.g., stream 35 in FIG. 1) can be removed as the low pressure liquid $CO_2$ stream. In the embodiments described above, about 1.5% to about 2.5% by mass of the net $CO_2$ product may be vented to the atmosphere with the combined $N_2$, $O_2$, and argon stream (e.g., stream 49 in FIG. 1), thus providing a $CO_2$ removal efficiency of about 97.5% to about 98.5%. In embodiments wherein the above-described method is carried out in connection with a closed cycle power system using $CO_2$ as the working fluid, the stream 49 preferably is vented to the atmosphere because removal of the inert components is desirable to keep their partial pressure and concentration as low as possible. Optionally, the stream 59, following pressure reduction in valve 60, can be routed through a set of passages in the heat exchanger 10 to provide extra refrigeration for cooling the stream 62 before the stream 59 is vented.

The utilization of an input high pressure $CO_2$ stream 24 provides a unique ability to provide indirect cooling to the high pressure $CO_2$ stream. As described in relation to the embodiments above, the indirect cooling can be provided by dividing out a portion of the high pressure $CO_2$ stream at near ambient temperature and then expanding this divided portion of the high pressure $CO_2$ stream to a temperature of about −20° C. or less, about −30° C. or less, or about −40° C. or less (e.g., approximately −40° C. to about −55° C.). This can be achieved by reducing the pressure of the high pressure $CO_2$ stream 24 down to less than about 20 bar (2 MPa), less than about 10 bar (1 MPa), or less than about 8 bar (0.8 MPa) (e.g., about 20 bar (2 MPa) to about 5 bar (0.5 MPa) or about 12 bar (1.2 MPa) to about 5 bar (0.5 MPa), particularly about 5.55 bar (0.555 MPa)). The resulting liquid plus vapor stream (e.g., stream 56 in FIG. 1) in then used to cool the bulk high pressure $CO_2$ stream indirectly in a heat exchanger.

The systems and methods of the present disclosure are particularly beneficial when used in combination with a power production method utilizing a $CO_2$ working fluid, such as the systems disclosed in U.S. Pat. No. 8,596,075, the disclosure of which is incorporated herein by reference in its entirety. In particular, such process can use a high pressure/low pressure ratio turbine that expands a mixture of a high pressure recycle $CO_2$ stream and combustion products arising from combustion of the fuel. Any fossil fuel, particularly carbonaceous fuels, may be used. Preferably, the fuel is a gaseous fuel; however, non-gaseous fuels are not necessarily excluded. Non-limiting examples include natural gas, compressed gases, fuel gases (e.g., comprising one or ore of $H_2$, CO, $CH_4$, $H_2S$, and $NH_3$) and like combustible gases. Solid fuels—e.g., coal, lignite, petroleum coke, bitumen, and the like, may be used as well with incorporation of necessary system elements (such as with the use of a partial oxidation combustor or a gasifier to convert the solid or heavy liquid fuels to a gaseous form). Liquid hydrocarbon fuels may also be used. Pure oxygen can be used as the oxidant in the combustion process. The hot turbine exhaust is used to partially preheat the high pressure recycle $CO_2$ stream. The recycle $CO_2$ stream is also heated using heat derived from the compression energy of a $CO_2$ compressor, as further discussed herein. All fuel and combustion derived impurities such as sulfur compounds, NO, $NO_2$, $CO_2$, $H_2O$, Hg and the like can be separated for disposal with no emissions to the atmosphere. A $CO_2$ compression train is included and comprises high efficiency units that ensure minimum incremental power consumption. The $CO_2$ compression train can particularly provide a recycle $CO_2$ fuel compressor flow that can be recycled in part to the combustor and directed in part to the liquid $CO_2$ production components as the input high pressure $CO_2$ stream.

Figure 2:
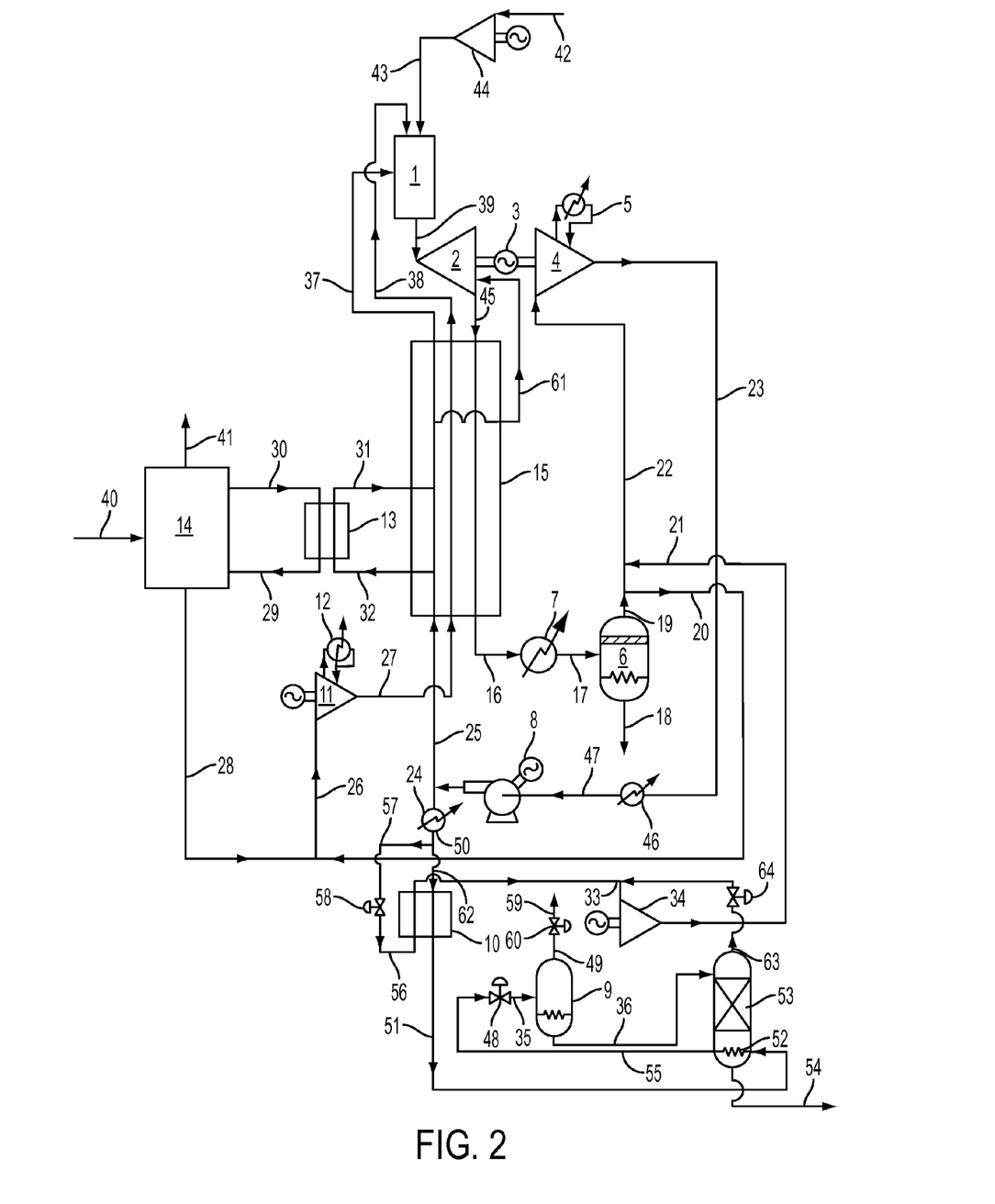
FIG. 2 shows a flow diagram of a system according to embodiments of the present disclosure for formation of a low pressure liquid $CO_2$ stream utilizing a portion of a high pressure $CO_2$ stream drawn from a power production process.

FIG. 2, for example illustrates a power production system combined with elements as described herein to produce the net $CO_2$ product derived from carbon in the primary fuel in the form of a low pressure liquid with an oxygen content in a minimal range as described herein. An embodiment of such system is described in the Example below in connection to FIG. 2.

The magnitude of the total $CO_2$ net product flow can be vary depending upon the nature of the fuel used. In embodiments utilizing a natural gas fuel, the total $CO_2$ net product flow can be about 2.5% to about 4.5% (e.g., about 3.5%) of the total recycle $CO_2$ fuel compressor flow. In embodiments utilizing a typical bituminous coal (e.g., Illinois No. 6), the total $CO_2$ net product flow can be about 5% to about 7% (e.g., about 6%) of the total recycle $CO_2$ fuel compressor flow. The quantity of recycled $CO_2$ used for refrigeration can be in the range of about 15% to about 35% or about 20% to about 30% (e.g., about 25%) by mass of the net $CO_2$ product flow.

In some embodiments, liquid natural gas (LNG) can be used as a refrigeration source in a manner such as described in U.S. Pat. Pub. No. 2013/0104525, the disclosure of which is incorporated herein by reference in its entirety. In particular embodiments, the LNG can be heated to a temperature approach to the condensing temperature of the $CO_2$ turbine exhaust (e.g., at a pressure of about 20 bar (2 MPa) to about 40 bar (4 MPa)). The turbine exhaust flow leaving the water separator can be dried in a desiccant drier to a dew point below about −50° C. before being liquefied using refrigeration derived from the high pressure LNG, which is in turn heated. The liquid $CO_2$ can now be pumped to a pressure of about 200 bar (20 MPa) to about 400 bar (40 MPa) using a multi-stage centrifugal pump. The high pressure natural gas will be at a temperature typically in the range of about −23° C. (for turbine exhaust leaving the economizer heat exchanger at about 20 bar (2 MPa)) to about 0° C. (for turbine exhaust leaving the economizer heat exchanger at about 40 bar (4 MPa)) using a 5° C. approach to the saturation temperature of $CO_2$ at these pressures. This cold, high pressure natural gas can be used to pre-cool the high pressure $CO_2$ at about 60 bar (6 MPa) to about 400 bar (40 MPa) prior to expansion to produce liquid $CO_2$ in the pressure range of about 6 bar (0.6 MPa) to about 30 bar (3 MPa). This refrigeration can be supplemented by additional refrigeration derived from expansion of high pressure $CO_2$ as described above to give a temperature of the cooled net $CO_2$ product which on expansion to the required pressure of the liquid $CO_2$ product results in a gas fraction containing about 50% to about 80% by mass of $(O_2+N_2+Ar)$. The effect is to significantly reduce the quantity of additional $CO_2$ which must be recycled for refrigeration.

EXAMPLE

Embodiments of the present disclosure are further illustrated by the following example, which is set forth to illustrate the presently disclosed subject matter and is not to be construed as limiting. The following describes an embodiment of a combined power production system and method and system and method for production of low pressure liquid $CO_2$, as illustrated in FIG. 2.

As seen in FIG. 2, a natural gas fuel stream 42 (which in this Example is pure methane) at about 40 bar (4 MPa) is compressed to about 320 bar (32 MPa) in a compressor 44 to provide a compressed natural gas fuel stream 43, which in turn enters a combustion chamber 1 where it combusts in a preheated oxidant stream 38, which comprises about 23% by mass of oxygen mixed with about 77% by mass of diluent $CO_2$. In the illustrated embodiment, the total oxygen quantity contains approximately 1% by mass more oxygen than is required for stoichiometric combustion. The combustion products are diluted in the combustor 1 by a heated recycle $CO_2$ stream 37 at about 304 bar (30.4 MPa) and about 707° C. A combustor exit stream 39 at a temperature of about 1153° C. is passed to a turbine 2 inlet, the turbine being coupled to an electric generator 3 and a main $CO_2$ recycle compressor 4.

The combustor exit stream 39 is expanded in the turbine 2 to provide a turbine exit stream 45 at about 30 bar (3 MPa) and about 747° C., which in turn is passed through an economizer heat exchanger 15 and is cooled to about 56° C. leaving as cooled turbine exit stream 16. The cooled turbine exit stream 16 is further cooled against cooling water in a water cooler 7 to near ambient temperature (stream 17 in FIG. 2). The cooled turbine exit stream 17 is passed through a separator 6 where a liquid water stream 18 is separated from a gaseous $CO_2$ overhead stream 19, which itself is divided into separate flows (streams 22 and 20 in FIG. 2).

The gaseous $CO_2$ overhead bulk stream 22 enters the $CO_2$ recycle compressor 4, which operates with an intercooler 5 and compresses the ambient temperature gaseous $CO_2$ overhead bulk stream 22 (derived from the turbine exit stream 45) from a pressure of about 28.2 bar (2.82 MPa) to about 63.5 bar (6.35 MPa)—i.e., compressed $CO_2$ stream 23.

The gaseous $CO_2$ overhead fraction stream 20 is used to dilute the 99.5% $O_2$ stream 28 (which is at a pressure of about 28 bar (2.8 MPa)) that is produced by the cryogenic air separation plant 14. Combined streams 20 and 28 form the low pressure oxidant stream 26, which is compressed to about 320 bar (32 MPa) (stream 27) in a compressor 11 with inter-coolers 12. The high pressure oxidant stream 27 is heated in the economizer heat exchanger leaving as the preheated oxidant stream 38 at about 304 bar (30.4 MPa) about 707° C.

A first side-stream 32 at about 110° C. is taken from the heating high pressure recycle $CO_2$ flow and heated to about 154° C. (stream 31 in FIG. 2) in side heat exchanger 13 against a heat transfer fluid (entering the side heat exchanger as stream 30 and exiting as stream 29) which removes heat of compression from the air compressors in the cryogenic air separation plant 14. The ASU has an atmospheric air feed 40 and a waste nitrogen exit stream 41 which is vented to the atmosphere.

A second side-stream 61 at a temperature of about 400° C. is taken from the heating high pressure recycle $CO_2$ stream and used in the turbine 2 for internal cooling.

The compressed $CO_2$ stream 23 at about 63.5 bar (6.35 MPa) and about 51° C. is cooled in a heat exchanger 46 against cooling water to provide stream 47 at about 17.5° C. with a density of about 820 kg/m³, which is pumped in a multi-stage centrifugal pump 8 to a pressure of about 305 bar (30.5 MPa). The pump discharge flow is divided into two parts.

High pressure recycle $CO_2$ stream 25 from the pump discharge flow is passed through the economizer heat exchanger 15 and functions as the flow from which the first side-stream and the second side-stream are taken (as discussed above).

The stream 24 from the pump discharge flow comprises the net $CO_2$ product stream derived from carbon in the natural gas. Stream 24 preferably can include an additional content of $CO_2$ for use in refrigeration. The additional $CO_2$ content can be up to about 50% by mass, up to about 40% by mass, or up to about 30% by mass of the recycle $CO_2$. In some embodiments, the additional $CO_2$ content can be about 5% to about 45% by mass, about 10% to about 40% by mass, or about 15% to about 35% by mass of the recycle $CO_2$.

The high pressure $CO_2$ stream 24 is cooled to near ambient temperature in a water cooler 50 and divided into two parts. High pressure $CO_2$ fraction stream 57 is reduced in pressure to about 8.2 bar (0.82 MPa) in valve 58 to form a cooling $CO_2$ stream 56, which is a two phase mixture at a temperature of about −45° C. The cooling $CO_2$ stream 56 is passed through heat exchanger 10 where it evaporates and heats to near ambient temperature leaving as $CO_2$ stream 33.

High pressure net $CO_2$ product stream 62 is passed directly into the heat exchanger 10 where it is cooled against the cooling $CO_2$ stream 56 to a temperature of about −38° C. leaving as cooled high pressure net $CO_2$ product stream 51. This stream is then passed through a small re-boiler 52 in the base of a stripping column 53 leaving as stream 55. This stream is reduced in pressure to about 10 bar (1 MPa) in valve 48 to form a two phase net $CO_2$ product stream 35, which is then passed through a separator 9.

The overhead vapor stream 49 exiting the top of the separator 9 encompasses about 4% by mass of the flow of two phase net $CO_2$ product stream 35 and is formed of about 30% by mass $CO_2$ and about 70% by mass of a combination of $O_2$ and argon. The overhead vapor stream 49 is reduced in pressure in valve 60 and then vented to the atmosphere (stream 59 in FIG. 2). Optionally, stream 59 can be heated in heat exchanger 10 to near ambient temperature providing extra refrigeration and then further heated to above ambient temperature to make the vent stream buoyant.

The liquid $CO_2$ stream 36 exiting the separator 9 at a pressure of about 10 bar (1 MPa) comprises about 96% by mass of the flow of two phase net $CO_2$ product stream 35. Stream 36 is fed to the top of the stripping column 53.

Exiting the bottom of the stripping column 53 is the low pressure liquid $CO_2$ product stream 54, which comprises the net $CO_2$ produced from carbon in the primary fuel feed to the power system. In the illustrated embodiment, stream 54 has an oxygen content below 10 ppm.

The top product stream 63 exiting the stripping column 53 is reduced in pressure to about 8 bar (0.8 MPa) in valve 64 and added to $CO_2$ stream 33. Combined streams 33 and 63 are compressed in compressor 34 to about 28.5 bar (2.85 MPa). The discharge stream 21 compressed in the $CO_2$ compressor 34 is mixed with gaseous $CO_2$ overhead bulk stream 22 and compressed back up to about 305 bar (30.5 MPa) in the $CO_2$ compressor 4 and the pump 8.

In the above example, specific values (e.g., temperature, pressure, and relative ratios) are provided to illustrate working conditions of an exemplary embodiment of the present disclosure. Such values are not meant to be limiting of the disclosure, and it is understood that such values may be varied within the ranges as otherwise disclosed herein to arrive at further working embodiments in light of the overall description provided herein.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A method for production of a low pressure liquid carbon dioxide (CO2) stream, the method comprising:
   combusting a carbonaceous or hydrocarbon fuel with oxygen in a combustor in the presence of a recycle CO2 stream at a pressure of 100 bar (10 MPa) to 400 bar (40 MPa) and a temperature of 400° C. to 1600° C. to form a combustor exit stream comprising CO2;
   expanding the combustor exit stream in a turbine to generate power and form a turbine exit stream comprising CO2 at a pressure of 50 bar (5 MPa) or less;
   cooling the turbine exit stream in a first heat exchanger to form a cooled turbine exit stream;
   pumping CO2 from the cooled turbine exit stream to a pressure of 100 bar (10 MPa) to 500 bar (50 MPa) to form a high pressure CO2 stream;
   dividing the high pressure CO2 stream into a bulk portion and a cooling portion;
   expanding the cooling portion of the high pressure CO2 stream to reduce the temperature thereof to −20° C. or less;
   cooling the bulk portion of the high pressure CO2 stream to a temperature of 5° C. or less by passing the bulk portion of the high pressure CO2 stream through a second heat exchanger against the expanded cooling portion of the high pressure CO2 stream; and
   expanding the cooled, bulk portion of the high pressure CO2 stream to a pressure that is about 30 bar (3 MPa) or less but is greater than the triple point pressure of CO2 so as to form the low pressure liquid CO2 stream.

2. The method according to claim 1, wherein the combustor exit stream is at a pressure of 200 bar (20 MPa) to 400 bar (40 MPa).

3. The method according to claim 1, wherein the combustor exit stream is at a temperature of 800° C. to 1,600° C.

4. The method according to claim 1, wherein the turbine exit stream comprising CO2 is at a pressure of 20 bar (2 MPa) to 10 bar (4 MPa).

5. The method according to claim 1, wherein the turbine exit stream is cooled in the heat exchanger to a temperature of 80° C. or less.

6. The method according to claim 5, further comprising passing the cooled turbine exit stream comprising $CO_2$ through one or more separators to remove at least water therefrom.

7. The method according to claim 1, further comprising heating one or both of the oxygen and the recycle $CO_2$ stream in the heat exchanger against the turbine exit stream.

8. The method according to claim 1, wherein the high pressure CO2 stream is at a pressure of 200 bar (20 MPa) to 400 bar (40 MPa).

9. The method according to claim 1, wherein the bulk portion of the high pressure CO2 stream is cooled to a temperature of −55° C. to 0° C.

10. The method according to claim 1, further comprising, after said cooling of the bulk portion of the high pressure $CO_2$ stream and prior to said expanding of the bulk portion of the high pressure $CO_2$ stream, passing the bulk portion of the high pressure $CO_2$ stream through a re-boiler.

11. The method according to claim 10, wherein the re-boiler is in a stripping column.

12. The method according to claim 1, further comprising passing the low pressure liquid $CO_2$ stream through a separator effective to separate a vapor stream therefrom.

13. The method according to claim 12, wherein the vapor stream comprises up to 8% by mass of the low pressure liquid CO2 stream passed through the separator.

14. The method according to claim 12, wherein the vapor stream comprises 1% to 75% by mass CO2 and 25% to 99% by mass of one or more of N2, 02, and Argon.

15. The method according to claim 12, further comprising passing the remaining low pressure liquid CO2 stream into a stripping column after passing through the separator.

16. The method according to claim 15, wherein the low pressure liquid CO2 stream exiting the stripping column has an oxygen content of no more than 25 ppm.

17. The method according to claim 15, comprising pumping the low pressure liquid CO2 stream to a pressure of 100 bar (10 MPa) to 250 bar (25 MPa) to form a pumped liquid CO2 stream.

18. The method according to claim 17, comprising delivering the pumped liquid $CO_2$ stream to a $CO_2$ pipeline.

19. The method according to claim 1, further comprising mixing an overhead vapor from the stripping column with the cooling portion of the high pressure CO2 stream exiting the second heat exchanger to form a mixture.

20. The method according to claim 19, further comprising adding the mixture to the cooled turbine exit stream.

* * * * *